United States Patent
Shaik et al.

(10) Patent No.: US 11,609,908 B2
(45) Date of Patent: *Mar. 21, 2023

(54) QUERY GENERATION FROM A NATURAL LANGUAGE INPUT

(71) Applicant: Bank of America Corporation, Charlotte, NC (US)

(72) Inventors: Johny Shaik, Kakinada (IN); Durgadatta Belhekar, Hyderabad (IN); Rama Krishnam Raju Rudraraju, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/459,816

(22) Filed: Aug. 27, 2021

(65) Prior Publication Data

US 2021/0390102 A1 Dec. 16, 2021

Related U.S. Application Data

(63) Continuation of application No. 16/516,384, filed on Jul. 19, 2019, now Pat. No. 11,151,131.

(51) Int. Cl.
*G06F 16/2452* (2019.01)
*G06F 16/22* (2019.01)
*G06F 16/2455* (2019.01)

(52) U.S. Cl.
CPC .... *G06F 16/24522* (2019.01); *G06F 16/2282* (2019.01); *G06F 16/2456* (2019.01)

(58) Field of Classification Search
CPC .......... G06F 16/24522; G06F 16/2282; G06F 16/2456
See application file for complete search history.

(56) References Cited

U.S. PATENT DOCUMENTS

| | | |
|---|---|---|
| 5,421,008 A | 5/1995 | Banning et al. |
| 5,724,568 A | 3/1998 | Bhargava et al. |
| 5,737,592 A | 4/1998 | Nguyen et al. |
| 5,752,017 A | 5/1998 | Bhargava et al. |
| 5,764,973 A | 6/1998 | Lunceford et al. |
| 5,829,006 A | 10/1998 | Parvathaneny et al. |

(Continued)

OTHER PUBLICATIONS

Li, F. et al., "Understandin Natural Language Queries over Relational Databases," SIGMOD Record, vol. 45, No. 1, Mar. 2016, pp. 6-13.

(Continued)

*Primary Examiner* — Albert M Phillips, III

(57) ABSTRACT

A query generation system receives, from a first device, a first input and a first project identifier and receives, from a second device, a second input and a second project identifier. The first and second inputs are the same and are in a natural language format that is not compatible with a downstream database management system. The system generates, based on the first input, a first database query. The system generates, based on the second input, a second database query. The first and second database queries are compatible with the downstream database management system. The system receives a first response to the first database query and a second response to the second database query from the downstream database management system. The system transmits the first response to the first device and the second response to the second device.

17 Claims, 4 Drawing Sheets

(56) References Cited

U.S. PATENT DOCUMENTS

| | | | |
|---|---|---|---|
| 5,873,075 | A | 2/1999 | Cochrane et al. |
| 5,884,299 | A | 3/1999 | Ramesh et al. |
| 5,924,089 | A | 7/1999 | Mocek et al. |
| 5,930,795 | A | 7/1999 | Chen et al. |
| 6,496,833 | B1 | 12/2002 | Goldberg et al. |
| 6,578,028 | B2 | 6/2003 | Egilsson et al. |
| 6,636,845 | B2 | 10/2003 | Chau et al. |
| 6,678,679 | B1 | 1/2004 | Bradford |
| 6,748,374 | B1 | 6/2004 | Madan et al. |
| 6,778,979 | B2 | 8/2004 | Grefenstette et al. |
| 6,842,758 | B1 | 1/2005 | Bogrett |
| 7,177,855 | B2 | 2/2007 | Witkowski et al. |
| 7,433,863 | B2 | 10/2008 | Zane et al. |
| 7,467,152 | B2 | 12/2008 | Kearsey et al. |
| 7,562,093 | B2 | 7/2009 | Gelb et al. |
| 7,653,652 | B2 | 1/2010 | Kagalwala et al. |
| 7,680,781 | B1 | 3/2010 | Wasserman et al. |
| 7,877,373 | B2 | 1/2011 | Zait |
| 8,019,750 | B2 | 9/2011 | Kosciusko et al. |
| 8,140,556 | B2 | 3/2012 | Rao et al. |
| 8,180,789 | B1 | 5/2012 | Wasserman et al. |
| 8,412,746 | B2 | 4/2013 | Fox et al. |
| 8,606,803 | B2 | 12/2013 | Bhatawdekar et al. |
| 8,719,246 | B2 | 5/2014 | Williams et al. |
| 8,738,606 | B2 | 5/2014 | Sarma et al. |
| 8,756,503 | B2 | 6/2014 | Privault et al. |
| 8,812,487 | B2 | 8/2014 | Krishnamurthy et al. |
| 9,128,945 | B1 | 9/2015 | Shukla et al. |
| 9,448,944 | B2 | 9/2016 | Seitz et al. |
| 9,542,447 | B1 | 1/2017 | Brennan et al. |
| 9,959,311 | B2 | 5/2018 | Boguraev et al. |
| 9,984,116 | B2 | 5/2018 | Rais Ghasem et al. |
| 10,157,175 | B2 | 12/2018 | Grosset et al. |
| 10,599,733 | B2 | 3/2020 | Kumar et al. |
| 10,970,322 | B2 | 4/2021 | Filoti et al. |
| 2005/0102284 | A1 | 5/2005 | Srinivasan et al. |
| 2007/0027905 | A1 | 2/2007 | Warren et al. |
| 2009/0319501 | A1 | 12/2009 | Goldstein et al. |
| 2011/0161371 | A1 | 6/2011 | Thomson et al. |
| 2011/0196864 | A1 | 8/2011 | Mason et al. |
| 2016/0188575 | A1 | 6/2016 | Sawaf |
| 2020/0004831 | A1 | 1/2020 | Burceanu et al. |
| 2021/0019312 | A1 | 1/2021 | Shaik et al. |

OTHER PUBLICATIONS

Kate, A. et al., "Conversion of Natural Language Query to SQL Query," International Conference on Electronics, Communication and Aerospace Technology (ICECA), downloaded Apr. 30, 2021, pp. 488-491.

Cai, R. et al., "An Encoder-Decoder Framework Translating Natural Language to Database Queries," Jun. 2018, 8 pages.

QUERY GENERATION FROM A NATURAL LANGUAGE INPUT

CROSS-REFERENCE TO RELATED APPLICATIONS

This application is a continuation of U.S. patent application Ser. No. 16/516,384 filed Jul. 19, 2019, by Johny Shaik et al., and entitled "QUERY GENERATION FROM A NATURAL LANGUAGE INPUT," which is incorporated herein by reference.

TECHNICAL FIELD

The present disclosure relates generally to querying information stored in a database. More particularly, in certain embodiments, the present disclosure is related to query generation from a natural language input.

BACKGROUND

A database stores information in a format and can be queried to retrieve particular subsets of the information. For instance, relational databases store information using a relational model that allows a corresponding query language to access and maintain information in the database. Database queries generally require "questions" posed to the database (e.g., to access certain information stored in the database) to be presented in formal query languages. These query languages are not accessible to general users because specialized knowledge and training is needed to create an appropriate database query. There exists a need for more effective tools for querying databases.

SUMMARY

In an embodiment, a query generation system receives, from a first device, a first input and a first project identifier and receives, from a second device, a second input and a second project identifier. The first and second inputs are the same and are in a natural language format that is not compatible with a downstream database management system. The system generates, based on the first input, a first database query. The system generates, based on the second input, a second database query. The first and second database queries are compatible with the downstream database management system. The system receives a first response to the first database query and a second response to the second database query from the downstream database management system. The system transmits the first response to the first device and the second response to the second device.

The present disclosure encompasses the recognition of previously unidentified problems associated with previous technology used to generate database queries, including the problems described in the following. For instance, previous approaches to querying a database require specialized knowledge of query languages used to generate appropriate query scripts. Accordingly, only specially trained individuals were capable of generating an appropriate script for a given query need. In some cases, a trained individual may need to use an iterative approach to create a query that meets the requirements of another untrained user. This iterative process results in inefficiencies and wasted system resources. Furthermore, conventional query tools fail to account for the context in which a database query is generated. For instance, a particular user may have preferences for which information from a database are accessed for a given query and how results of a query are presented. Processing resources and other system resources are wasted when queries are generated incorrectly for the user's needs or preferences.

The systems described in the present disclosure provide technical solutions to the technical problems of previous systems, including those discussed above, by facilitating the efficient generation of user-specific database queries using natural language inputs. For example, the disclosed system provides several technical advantages which include 1) efficient and effective generation of database queries with decreased processing costs, 2) increased reliability of generated queries based on a specially designed data quality layer that is specific to a user associated with the query, and 3) improved efficiency of and usability of databases. As such, the system described in the present disclosure may improve the function of computer systems used to generate database queries, while also providing the capability of generating user-specific queries based on inputs provided in a natural language format (i.e., in the format the same as or similar to that of a natural language such as English). The system may also reduce or eliminate barriers to interacting with information stored in databases which otherwise may not be effectively accessed using previously available technology. The system described in the present disclosure may particularly be integrated into a practical application for the automatic generation of Structured Query Language (SQL) queries that are linked (e.g., associated) with particular projects associated with a given user (e.g., as assigned by an employer or other entity), thereby ensuring that each user queries the appropriate database information that is associated with his/her project and/or that results are provided in a user-friendly, project-specific format.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Prior to the present disclosure, there was a lack of tools for effectively and reliably retrieving database information using a query that is in a natural language format. A natural language format corresponds to the format of a natural language (e.g., English). As described with respect to illustrative examples of FIGS. 1-4 below, the present disclosure facilitates the efficient generation of user-specific database queries from a natural language input.

Query Generation System

Figure 1:
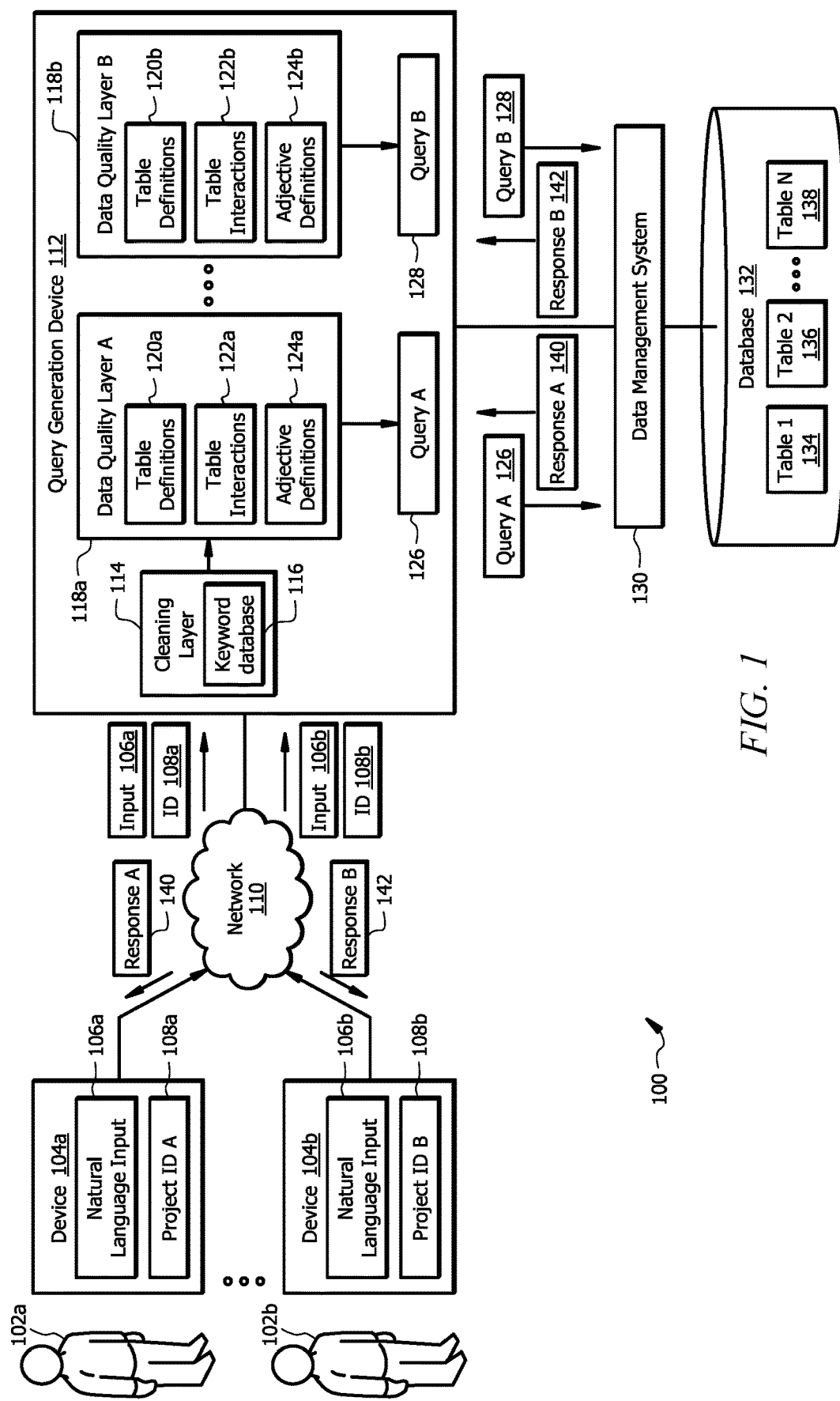
FIG. 1 is a schematic diagram of an example query generation system, according to an illustrative embodiment of the present disclosure.

FIG. 1 is a schematic diagram of an example query generation system 100. The query generation system 100 is generally configured to transform a natural language input 106a,b provided by users 102a,b into corresponding user-specific queries 126, 128 and to send the resulting responses 140, 142 to user devices 104a,b. The query generation system 100 provides the ability to receive natural language inputs 106a,b, which are not compatible with a downstream database management system 130 and/or a downstream database 132, and generate corresponding queries 126, 128 that are not only compatible with the database management system 130 and database 132 but are also tailored to the users 102a,b who provided the inputs 106a,b (e.g., or a project, activity, or other entity associated with the users 102a,b).

The query generation system 100 includes a first computing device 104a associated with user 102a, a second user device 104b associated with user 102b, a network 110, a query generation device 112, a downstream database management system 130, and one or more downstream databases 132. The query generation system 100 may be configured as shown or in any other suitable configuration. Examples of the query generation system 100 in operation are described with respect to FIG. 2 and FIG. 3 below.

User devices 104a,b are generally any computing devices capable of receiving user inputs corresponding to natural language inputs 106a,b, storing project identifiers 108a,b, and transmitting the natural language inputs 106a,b and project identifiers 108a,b to the query generation device 112 (e.g., via network 110). For example, each of the user devices 104a,b may be a computer or a mobile device. Devices 104a,b are also configured to receive responses 140, 142 from the query generation device 112. In the illustrative example of FIG. 1, device 104a is associated with a first user 102a and stores a first natural language input 106a and a first project identifier 108a, while user device 104b is associated with a second user 102b and stores a second natural language input 106b and a second project identifier 108b. As described in greater detail below, the natural language inputs 106a,b, generally include a string of characters corresponding to a question asked in a natural language (e.g., English). The project identifiers 108a,b, may be any appropriate identifier (e.g., presented as an alphanumeric string or in any other appropriate format) that associates each of the users 102a,b and their devices 104a,b to a particular project, activity, or entity. In certain embodiments, such as described with respect to FIG. 2 below, the natural language inputs 106a,b are the same (i.e., the inputs 106a,b contain the same set of characters, words, and/or phrases). In general, however, each of natural language inputs 106a,b may be different.

Network 110 facilitates communication between and amongst the various components of the query generation system 100. This disclosure contemplates network 110 being any suitable network operable to facilitate communication between the components of the system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The query generation device 112 is generally any computing device configured to receive natural language inputs 106a,b from user devices 104a,b and generate corresponding queries 126, 128. These queries 126, 128 are used to retrieve responses 140, 142 from the downstream database management system 130, based on information stored in the one or more downstream databases 132. The query generation device 112 sends responses 140 and 142 to the corresponding user devices 104a and 104b, respectively. The query generation device 112 may be a standalone device or a distributed device (e.g., executed on a distributed server or as a cluster of devices). The query generation device 112 may be implemented using the hardware, memory and interfaces of device 400 described with respect to FIG. 4 below.

The query generation device 112 includes a cleaning layer 114 and a plurality of data quality layers 118a,b. In general, the cleaning layer 114 is configured to modify, as appropriate, natural language inputs 106a,b before the data quality layers 118a,b are used to generate queries 126, 128. For instance, the cleaning layer 114 may include a keyword database 116 of information (e.g., stored in one or more tables) used to clean or preprocess the natural language inputs 106a,b into a format that is more amenable for use by the data quality layers 118a,b. For example, the cleaning layer 114 may convert a case of letters presented in the natural language inputs 106a,b to a more appropriate case for processing in the data quality layers 118a,b (e.g., to change unnecessarily capitalized letters to lowercase letters). The cleaning layer 114 may be used for tokenization of certain characters, words, and/or phrases appearing in the natural language inputs 106a,b. For example, for a given word (e.g., "where") or word-character combination (e.g., "where AND "?"), a corresponding token (e.g., a "find location" token) may be generated, based on information in the keyword database. Such tokens may be used to aid in identifying information from the downstream database(s) 132 to access via queries 126, 128. In some embodiments, tokenization may provide for the replacement of sensitive information (e.g., the names of users 102a,b) with corresponding tokens (e.g., anonymous user identifiers corresponding to users 102a,b). The cleaning layer 114 may remove stop words (e.g., "the," "a," "an," etc.) and/or any other characters and/or words from the natural language inputs 106a,b not useful for query generation. The cleaning layer 114 may be implemented using the cleaning layer data 410 stored in the device 400 described with respect to FIG. 4 below.

The plurality of data quality layers 118a,b include but are not limited to the first data quality layer 118a and second data quality layer 118b shown in FIG. 1. In general, the data quality layers 118a,b facilitate the generation of user-specific queries 126, 128 from the natural language inputs 106a and 106b (e.g., as originally provided by user 102a,b or as "cleaned" by cleaning layer 114). The query generation device 112 generally uses the project identifiers 108a,b to determine which data quality layer 118a,b to use for the generation of queries 126, 128 from inputs 106a,b. In the illustrative example of FIG. 1, the first project identifier 108a is associated with the first data quality layer 118a, and the second project identifier 108b is associated with the second data quality layer 118b. These associations inform the query generation device 112 that the first natural language input 106a should be processed using the first data quality layer 118a and that the second natural language input 106b should be processed using the second data quality layer 118b. Each of the data quality layers 118a,b includes corresponding project-specific information for generating database queries 126, 128.

The project-specific information of the data quality layers 118a and 118b includes the table definitions 120a and 120b, table interactions 122a and 122b, and adjective definitions 124a and 124b, respectively. The table definitions 120a,b generally include project-specific definitions related to the information stored in tables 134, 136, 138. As such, the table definitions 120a,b facilitate the retrieval of appropriate user-specific (e.g., or project specific) information from database 132.

TABLE 1 shows examples of table definitions 120a,b. Table definitions 120a,b may be stored in a table format similar to or the same as that shown in TABLE 1 or in any other appropriate format. The first column of TABLE 1 (i.e., the "Column" column) corresponds to the names of columns in tables of the database 132 (e.g., in the plurality of tables 134, 136, 138). The second column of TABLE 1 (i.e., the "Table" column) corresponds to the names of tables (e.g., corresponding to the plurality of tables 134, 136, 138) of database 132. In this example, the tables have names of LU_Cust, LU_Year, LU_Quarter, LU_Month, LU_Year, LU_Product, and Fact_Rev. For example the LU_Cust table may store customer information such as customer addresses, customer statuses (e.g., whether a customer is an active customer, former customer, potential new customer, etc.), customer types (e.g., whether the customer is an individual or business), and customer names or identifiers. The LU_Year, LU_Quarter, LU_Month, LU_Year tables may store time data (e.g., related to dates of transactions by the various customers). The LU_Product table may store information associated with products (e.g., product names, product costs, etc.). The Fact_Rev table may store information related to revenue (e.g., associated with sales of products to customers).

TABLE 1

Example table definitions.

| Column | Table | Group | Entry Point | Type |
| --- | --- | --- | --- | --- |
| Customer Address | LU_Cust | Customer | Cust_ID | Dimension |
| Customer Status | LU_Cust | Customer | Cust_ID | Dimension |
| Customer Type | LU_Cust | Customer | Cust_ID | Dimension |
| Customer Name | LU_Cust | Customer | Cust_ID | Dimension |
| Year | LU_Year | Time | Day_ID | Dimension |
| Year | LU_Year | Time | Quarter_ID | Dimension |
| Quarter_ID | LU_Quarter | Time | Quarter_ID | Dimension |
| Quarter_ID | LU_Quarter | Time | Day_ID | Dimension |
| Month_ID | LU_Month | Time | Day_ID | Dimension |
| Day_ID | LU_Day | Time | Day_ID | Dimension |
| Product_ID | LU_Product | Product | Product_ID | Dimension |
| Revenue | Fact_Rev | N/A | N/A | Measure |

The table definitions 120a,b may also identify a table type (i.e., the fifth or "Type" column of TABLE 1). For example, in the example of TABLE 1, the Fact_Rev is a measure or fact table. A fact table generally stores measurement values (e.g., numerical values) and is the central table of the database(s) 132. The other tables (i.e., the LU_Cust, LU_Year, LU_Quarter, LU_Month, LU_Year, and LU_Product tables) are dimension tables, which provide companion information to the Fact_Rev table.

For each combination of table (second column of TABLE 1) and column (first column of TABLE 1), there is a corresponding entry point (fifth column of TABLE 1) and group (fourth column of TABLE 1). The entry points generally correspond to columns in the associated fact table (e.g., Fact_Rev table) that store information associated with the table and column combination. The entry point may be used to ensure that a query associated with a given table and column also points to appropriate measurement data associated with the entry point column of the fact table. For instance, if a natural language input (e.g., input 106a or 106b) is determined to be associated with the "Customer Type" column of table "LU_Cust," the query may be structured to request information from the Cust_ID column of the fact table Fact_Rev (see fourth row of TABLE 1). In some embodiments, a given table and column combination (e.g., "Year" column and "LU_Year" table) may be associated with more than one entry point (e.g., entry points "Day_ID" and "Quarter_ID"), as shown in rows six and seven of TABLE 1. This facilitates the generation of queries (e.g., queries 126, 128) that access all appropriate fact table data for the user (e.g., for the corresponding users 102a,b).

As described above, the table definitions 120a,b may also associate each table (second column of TABLE 1) and column (first column of TABLE 1) with a corresponding group (third column of TABLE 1), entry point (column four of TABLE 1). The groups allow relationships to be established amongst columns of the tables (e.g., based on business hierarchies or the like). For example, if a natural language input 106a,b includes the word "customer," the example table definitions of TABLE 1 may associate this word with the "Customer" group. As such, the resulting query (e.g., query 126 or 128) may include references to tables and columns associated with this group. For instance, the query may be directed to the LU_Cust table and, depending on other characters, words, and/or phrases in the natural language input 106a,b, the query may access information stored in any one or more of the "Customer Address," "Customer Status" column, "Customer Type" column, and "Customer Name" column.

Referring again to FIG. 1, the table interactions 122a,b, which generally define user-specific (e.g., or project specific) instructions for appropriately combining tables that are accessed in a given query (e.g., in a user-specific or project-specific manner). TABLE 2 shows examples of table interactions 122a,b. The table interactions 122a,b may facilitate querying appropriate combinations of the plurality of tables 134, 136, 138 of database(s) 132. The table interactions 122a,b may also indicate the appropriate manner in which to access information stored in two or more of the tables 134, 136, 138 using queries 126, 128. For example, information in the "Join" column (i.e., the fourth column of TABLE 2) may be used to appropriately join two tables via an inner join, a left outer join, a right outer join, or any other appropriate join type for the generation of query 126 and/or query 128. The table interactions 122a,b may also include information for filtering the data (i.e., in the fifth or "Filter" column of TABLE 2), for example, according to preferences associated with the project identifier 108a,b (e.g., to provide user-specific or project-specific filtering). For instance, a flag may be included in the query 126 and/or 128 to filter information (e.g., based on a Boolean operation). Table joins and filtering may be applied, based on the table interactions 122a,b, to improve data quality of responses 140, 142 for the users 102a,b.

TABLE 2

Example table interactions.

| Entry Point | Measure | Table | Join | Filter |
|---|---|---|---|---|
| Cust_ID | Count | LU_Cust | | |
| Cust_ID | Revenue | LU_Cust; Fact_Rev | Inner | |
| Cust_ID | Transaction | LU_Trans; Fact_Trans | Left outer | Flag = N |
| Product_ID | Count | LU_Cust | Inner | |
| Product_ID | Revenue | LU_Cust; Fact_Rev | Right outer | |
| Product_ID | Transaction | LU_Trans | Left outer | Flag = Y |
| Day_ID | Revenue | LU_DAY; Fact_Rev | Inner | |
| Quarter_ID | Revenue | LU_Quarter; Agg_Rev | Inner | |

Referring again to FIG. 1, the adjective definitions 124a,b generally include numerical values associated with user-specific or project-specific meanings of adjectives that appear in natural language inputs 106a,b. The adjective definitions 124a,b may be specific to the corresponding user 102a,b or an associated project based on the project identifiers 108a,b, which determine whether inputs 106a and 106b are processed using data quality layer 118a or 118b, respectively.

TABLE 3 shows examples of adjective definitions 126a,b. Each adjective shown in the first column of TABLE 3 (i.e., the "Adjective" column) generally has an associated value, which is shown in the third column of TABLE 3 (i.e., the "Value" column). Each adjective may also be associated with a corresponding noun (i.e., as shown in the second or "Noun" column of TABLE 3), which corresponds to the word that is modified by the adjective in the natural language input 106a,b. For example, for a given user 102a,b associated with the example adjective definitions 126a,b shown in TABLE 3, an adjective of "Repeated" when used to modify the noun "Customer" corresponds to a value of 2. Thus, the query generated using the example adjective definitions of TABLE 3 may include a conditional statement corresponding to a repeated customer being a customer who has made greater than two purchases. Adjective definitions for a different user (e.g., adjective definitions 124b) may include different values for one or more of the adjective-noun combinations shown in TABLE 3 and/or values for different adjective-noun combinations. For example, a different set of adjective definitions may have a different threshold for determining that a customer is a "repeated customer." For example, the "repeated-customer" verb-noun combination may be associated with a value of four (e.g., as shown in the example discussed below with respect to FIG. 2), resulting in a higher threshold for identifying a customer as a repeated customer. In general, the same adjective may be associated with a different value when it is used to modify a different noun.

TABLE 3

Example adjective definitions.

| Adjective | Noun | Value |
|---|---|---|
| Repeated | Customer | 2 |
| High | Customer | 4 |
| Low | Customer | 2 |
| Top | Customer | 5 |
| Bottom | Customer | 10 |

Referring again to FIG. 1, the database management system 130 is generally any system (i.e., comprising hardware and/or software) configured to receive queries 126, 128 and generate corresponding responses 140, 142, based on information stored in the one or more downstream databases 132. More generally, the database management system 130 may be configured to manage information stored in downstream database(s) 132 (e.g., by creating, reading, updating, and/or deleting information stored in the downstream database(s) 132). The database management system 130 is generally configured to retrieve information from database(s) 132 based on structured queries (e.g., queries 126, 128 of FIG. 1) and transmit the retrieved information as query responses (e.g., responses 140, 142). The structured queries are generally provided in a query language that is associated with (e.g., that is compatible with) the database management system 130 and the database(s) 132. For instance, in certain embodiments, queries 126, 128 are Structured Query Language (SQL) queries. The database management system 130 may be communicatively connected to the query generation device 112 and database(s) 132 through wired or wireless communication (e.g., via network 110). The database management system 130 may be implemented using the hardware, memory and interfaces of device 400 described with respect to FIG. 4 below.

The one or more databases 132 may be any database for storing a plurality of tables, including a first table 134, a second table 136, and an nth table 138. This disclosure contemplates database(s) 132 storing information (e.g., in tables 134, 136, 138) arranged in any appropriate format such that queries 126, 128 may be appropriately interpreted by the database management system 130 to generate corresponding responses 140, 142. For example, in addition to tables 134, 136, 138, database(s) 132 may store files, directories, and/or queues. In some embodiments, database(s) 132 are a relational database. In some embodiments, the database(s) 132, alone or in combination with the database management system 130, comprise a data warehouse which is configured to extract, organize, and store information from a plurality of different data sources. Database(s) 132 may be communicatively connected to the database management system 130 and/or the query generation device 112 through wired or wireless communication (e.g., via network 110).

Example Operation of the Query Generation System

In an example operation of the query generation system 100, the first and second users 102a,b provide natural language inputs 106a,b to their corresponding devices 104a,b. The natural language inputs 106a,b may be provided manually (e.g., using a keyboard, keypad, or touchscreen associated with devices 104a,b), using voice recognition (e.g., using a microphone associated with devices 104a,b), or through any other appropriate procedure or input device associated with devices 104a,b. The project identifiers 108a,b may be provided by the users 102a,b (e.g., via any input provided as described above) or may be previously stored on the devices 104a,b (e.g., to associate the users 102a,b and/or their devices 104a,b with the appropriate corresponding data quality layers 118a,b of the query generation device 112). The natural language inputs 106a,b and corresponding project identifiers 108a,b are transmitted to (i.e., and received by) the query generation device 112 via network 110, as illustrated in FIG. 1.

Figure 2:
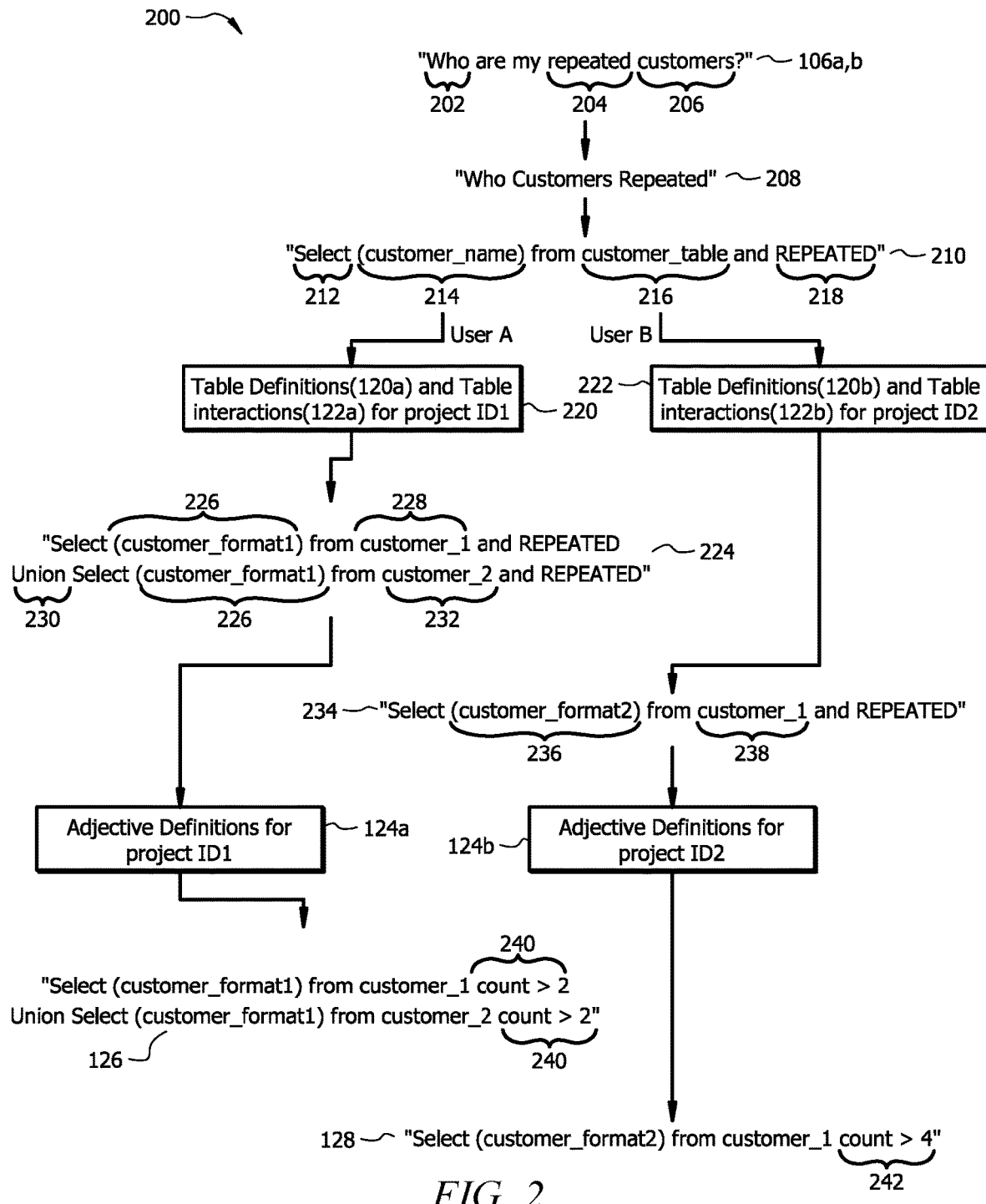
FIG. 2 is a flow diagram illustrating the transformation of a natural language input into two different database queries using the system of FIG. 1.

FIG. 2 shows a flow diagram 200 illustrating an example of the generation of queries 126, 128 from user inputs 106a,b received by the query generation device 112. In this illustrative example, each user 102a,b provides the same natural language input 106a,b corresponding to the natural language question "Who are my repeated customers?". While the natural language inputs 106a,b of this example are provided in English, the present disclosure contemplates the natural language inputs 106a,b being provided in any natural language. The input 106a,b includes a first portion 202 (corresponding to the word "who"), a second portion 204 (corresponding to the word "repeated"), and a third portion 206 (corresponding to the word "customer").

As described above, the natural language inputs 106a,b may be modified and/or adjusted using the cleaning layer 114 shown in FIG. 1 to generate a "cleaned" input 208. As described above, cleaning may involve removal of information that is not used by the data quality layers 118a,b. In this illustrative example, the inputs 106a,b are cleaned to remove the words "are" and "my," which are not used by data quality layers 118a,b.

The cleaned input 208 may be used to generate an initial query 210. The initial query 210 may have a format that is compatible with the database management system 130 and/or the downstream database(s) 132. However, as shown in the example of FIG. 2, the initial query 210 does not yet include user-specific information, which will be determined by data quality layers 118a,b. Instead, the initial query 210 includes an initial query action 212 (or command) an initial column identifier 214, an initial table identifier 216, and an initial adjective 218. Any one or more of these items (i.e., the initial query action 212, the initial column identifier 214, the initial table identifier 216, and/or the initial adjective 218) may act as a placeholder for user-specific information that is determined using the appropriate data quality layer 118a,b for each user 102a,b. For instance, the initial query action 212 of "Select" may correspond to an actual query action (as is the case in this example) or may be a placeholder for an action to be further determined using the data quality layers 118a,b.

For the first user 102a, data quality information 220, which includes the table definitions 120a and table interactions 122a associated with the first project identifier 108a of FIG. 1, is used to generate a first updated query 224. As shown in FIG. 2, the updated query 224 includes a column identifier 226 (in place of the initial column identifier 214), a table identifier 228 (in place of the initial table identifier 216), an added join command 230, and an added table identifier 232. For example, the column identifier 226 and the table identifier 228 may be determined using the table definitions 120a (e.g., which include information similar to that shown in TABLE 1 above). For example, the column identifier 226 and the table identifier 228 may be identified as corresponding to a user-specific customer name (i.e., in place of the initial column identifier 214) and to a user-specific customer table (i.e., in place of the initial table identifier 216).

Still referring to the first updated query 124, the added join command 230 and the added table identifier 232 may be identified using the table interactions 122a associated with user 102a (i.e., via project identifier 108a). For example, information associated with the table interactions 122a (e.g., as exemplified by TABLE 2 described above) may be used to determine appropriate tables to include in the to-be-generated query 126 and the appropriate join type to use to combine the tables. For instance, as described above with respect to FIG. 2, the table interactions 122a may provide information about whether two or more tables should be joined using an inner join, a left outer join, a right outer join, or any other appropriate join type.

Similarly, for the second user 102b, data quality information 222, which includes the table definitions 120b and table interactions 122b associated with the second project identifier 108b of FIG. 1, is used to generate a second updated query 234. The updated query 234 includes a column identifier 236 and a table identifier 228, which may be identified using the table definitions 120b, as described above. In this example, no related tables were identified, based on the table interactions 122b, to include in the updated query 234 (e.g., using a "join" command). The updated second query 224 is different than the updated first query 224.

For the first user 102a, the adjective definitions 124a are used to determine a conditional statement 240 corresponding to the initial adjective 218 of "REPEATED." Using the adjective definitions 124a, the adjective "repeated" is associated with a value of 2, when used to modify the noun "customer" (e.g., as shown in the example of TABLE 3). This value determined from the adjective definitions 124a is used to generate the first query 126 with the appropriate adjective-based conditional statement 240 of "count >2" for user 102a. In other words, the adjective definitions 124a for user 102a are used to transform the adjective "repeated" into the appropriate user-specific conditional statement 240 of "count >2" to include in query 126.

For the second user 102b, the adjective definitions 124b are used to determine a conditional statement 242 corresponding to the initial adjective 218 of "REPEATED." In this illustrative example, the adjective "repeated" is associated with a value of 4, when used to modify the noun "customer" in the adjective definitions 124b. This value corresponds to a different (e.g., higher threshold) definition of the adjective "repeated" than was used for user 102a above (i.e., because a customer must be repeated greater than four times to be considered repeated rather than greater than two times as for user 102a). The value determined from the adjective definitions 124b is used to generate the second query 128 with the appropriate adjective-based conditional statement 242 of "count >4" for user 102b. In other words, the unique adjective definitions 124b for user 102b are used to transform the adjective "repeated" into the appropriate user-specific conditional statement 242 of "count >4" to include in query 128. Accordingly, in this example, even though the first and second natural language inputs 106a,b are the same, the first and second queries 126, 128 are different.

Referring again to FIG. 1, after the queries 126, 128 are generated by device 112, the queries 126, 128 are transmitted to the downstream database management system 130. The database management system 130 receives queries 126, 128; identifies information from database(s) 130 to include in responses 140, 142 to these queries 126, 128 and (optionally) a format of how the information is presented in responses 140, 142; and sends responses 140, 142 to the query generation device 112. The query generation device 112 then transmits the first results 140 to the first device 104a, which is associated with user 102a, and the second results 142 to the second device 104b, which is associated with user 104b. In some embodiments, the first results 140 are different than the second results 142.

Example Method of Query Generation

Figure 3:
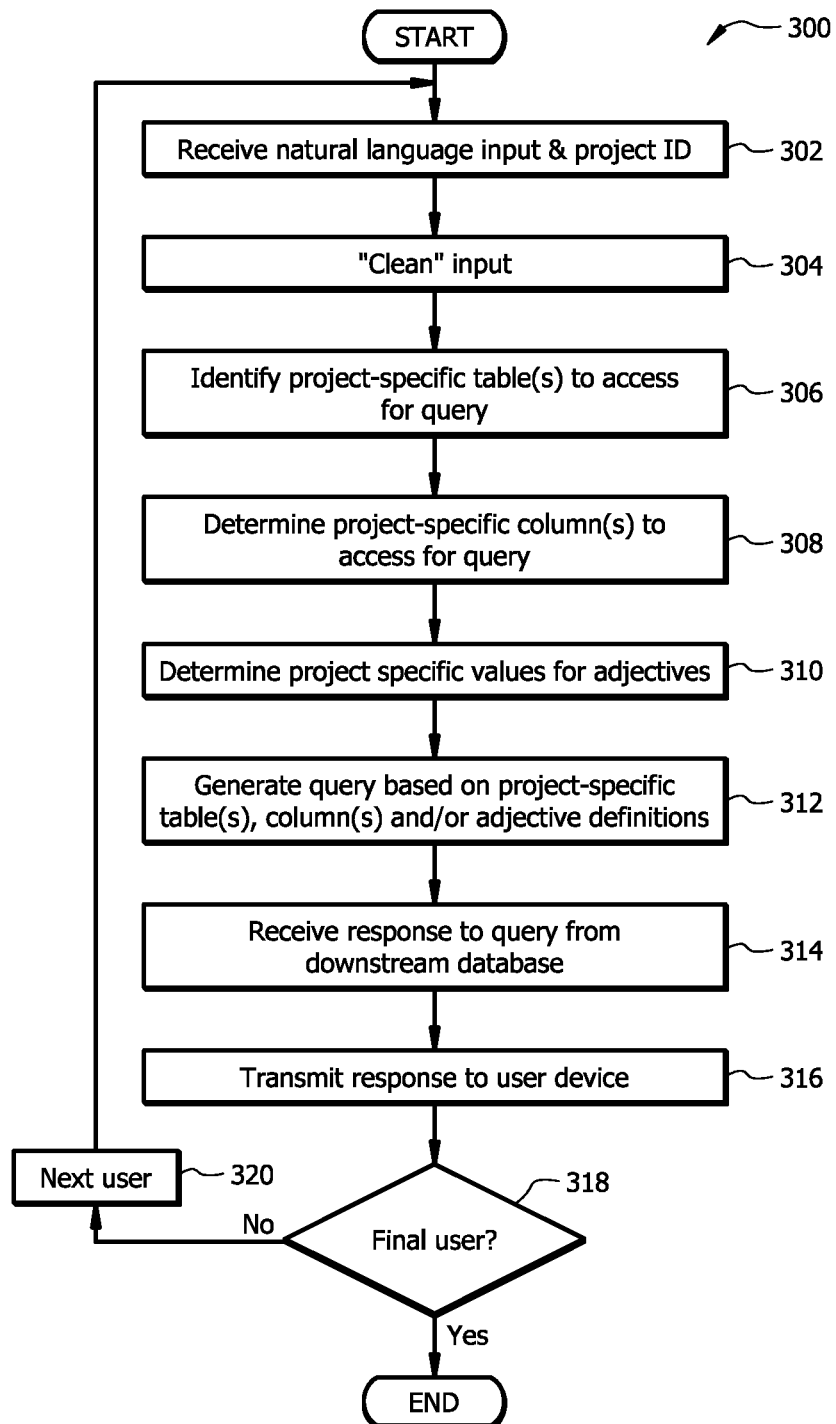
FIG. 3 is a flowchart of a method for operating the example query generation system illustrated in FIG. 1.

FIG. 3 is a flowchart of an example query generation method 300. The query generation system 100 may implement method 300 to generate queries 126, 128 based on natural language inputs 106a,b. At step 302, the query generation device 112 receives a natural language input 106a and a project identifier 108a from device 104a associated with user 102a. As described above, the natural language input 106a may be provided in a user interface displayed on device 104a. The input 106a may be provided manually (e.g., using a keyboard, keypad, or touchscreen associated with device 104a), using voice recognition (e.g., using a microphone associated with device 104a), or through any other appropriate procedure or input device associated with device 104a. The project identifier 108a may be provided by the user 102a (e.g., via any of the input approaches and/or devices described above) or may be previously stored on device 104a (e.g., to associate the user 102a and/or his/her device 104a with a corresponding data quality layer 118a of the query generation device 112). The natural language input 106a and the device identifier 108a may be transmitted to the query generation device 112 via wired and/or wireless communication, as appropriate (e.g., via network 110).

At step 304, the query generation device 112 may "clean" the received input 106. For instance, the cleaning layer 114 of the query generation device 112 may access the keyword database 116 to translate certain portions (e.g., characters, words, and/or phrases) of the natural language input 102a into a modified format for more efficient processing in the data quality layer 118a. For instance, as described above with respect to FIG. 2, cleaning may involve removing, rearranging, and/or reformatting characters, words, and/or phrases appearing in the natural language input 106a. For example, cleaning may include converting a case of letters presented in the natural language input 106a to a more appropriate case for processing in the subsequent steps of method 300 (e.g., to add and/or remove capitalized letters from the natural language input 106a). Cleaning may include tokenization of certain characters, words, and/or phrases appearing in the natural language input 106a (e.g., to replace a name of an individual with an anonymous token). Cleaning may include removing stop words (e.g., "the," "a," "an," etc.) and/or any other words from the natural language input 106a not used for query generation.

At step 306, data quality layer 118a associated with the project identifier 108a is used to identify project-specific (e.g., or user-specific) tables (e.g., one or more of tables 134, 136, 138 stored in the database(s) 132) which should be accessed or searched using the to-be-generated query 126. For instance, table definitions 120a may be used to identify tables (e.g., one or more of tables 134, 136, 138) which are associated with portions of the received natural language input 106a and/or the cleaned input obtained at step 304. Table interactions 122a may be used to determine related tables to access in the to-be-generated query 126, how the relate tables should be appropriately joined in the query 126, and/or filtering conditions that might be included in the query 126 (e.g., as described with respect to TABLE 2 and FIG. 2 above).

At step 308, the query generation device 112 determines columns to access from the one or more tables identified at step 306, using data quality layer 118a. For instance, the table definitions 120a may include information (e.g., the "Column" and "Entry Point" information described with respect to TABLE 1 above) for determining which columns of the tables 134, 136, 138 of the database 132 should be included in query 126 for user 102a. For example, as described with respect to FIG. 2, entry points may be identified to determine which columns of an associated fact table to reference in the to-be-generated query 126.

At step 310, project-specific adjective definitions 124a are accessed from the data quality layer 118a to determine values to include in conditional statements of the query 126 that correspond to the meaning of one or more adjectives appearing in the natural language input 106a. For instance, the adjective definitions 124a may be used, as described above with respect to TABLE 3 and FIG. 2, to determine a quantity associated with an adjective appearing in the natural language input 106. The value from the adjective definitions 124a is used to generate a filtering or conditional statement to include in the query 126.

At step 312, the query 126 is generated based on the table(s) (e.g., the one or more of tables 134, 136, 138) identified in step 306, the columns of the tables identified at step 308, and the adjective values determined at step 310. For instance, the results of steps 306, 308, and 310 may be combined according to predefined query formatting rules to create a query 126 that is compatible with the downstream database 132. For example, the tables, columns, and adjective values determined previously in method 300 may be used to replace corresponding placeholder values in an initial query (e.g., such as initial query 210 described with respect to FIG. 2 above).

At step 314, the query generation device 112 receives a response 140 to the query 126. The response is generally generated by the database management system 130, based on information stored in database(s) 132 (e.g., in one or more of tables 134, 136, 138) and returned to query generation device 112. At step 316, the response 140 is transmitted to the device 104a associated with user 102a. The response 140 may be transmitted through wired and/or wireless communication (e.g., via network 110, as illustrated in FIG. 1 above). The response 140 may be presented on a display of the device 104a for presentation to the user 102a. For example, the response 140 may be presented as one or more graphs, one or more charts, one or more tables, and/or any other presentation format appropriate for consumption by the user 102a. The response 140 may be saved to a memory of the device 104a. In some embodiments, the response 140 is not transmitted to the device 104a, and instead the response 140 is saved in the query generation device (e.g., in a memory, such as memory 404 of device 400 described below) for retrieval at a later time.

At step 318, the query generation device 112 determines whether the final user input has been processed by method 300. If the final user input has been processed, method 300 ends. If there are additional user inputs to process (e.g., input 106b from user 102b of FIG. 1), the method 300 restarts at step 302 to receive the next input (e.g., input 106b) and project identifier for the next user (e.g., project identifier 108b), and steps 304 to 318 of method 300 are repeated for this input to generate a query for the user and transmit a response to the user's device (e.g., to generate query 128 for user 102b and transmit the corresponding response 142 to device 104b).

While method 300 shows the input from each user being processed serially (e.g., to generate a corresponding query for each user through the consecutive performance of steps 302 to 316 for each user), it should be understood that inputs from two or more users may alternatively be processed in parallel. For example, the query generation device 112 may be configured to receive and process two or more natural language inputs (e.g., natural language inputs 106a and 106b) simultaneously (e.g., using parallel processing).

Example Device for Implementing the Query Generation System

Figure 4:
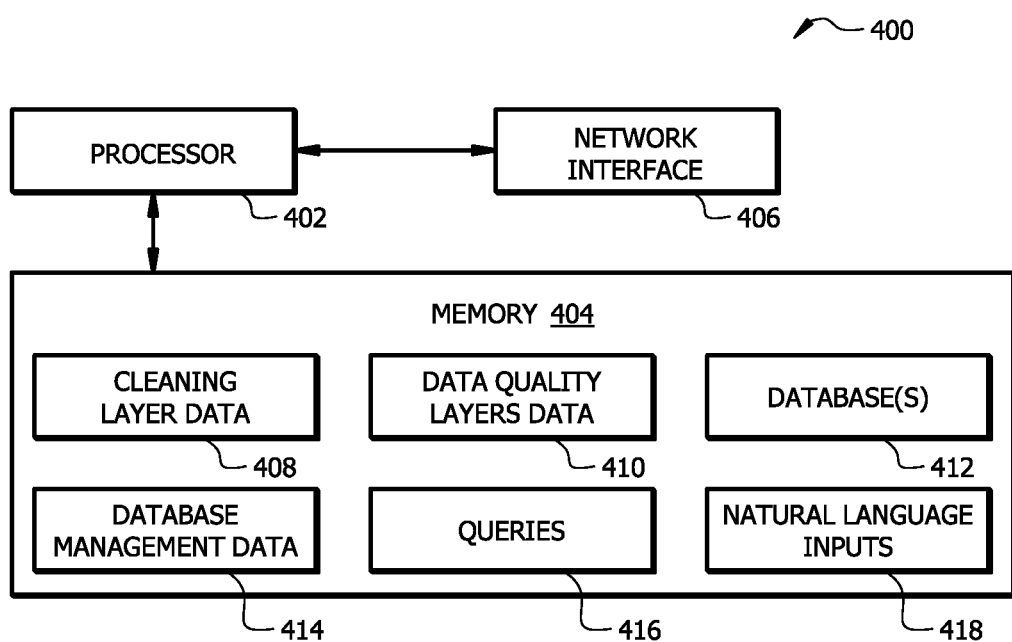
FIG. 4 is an embodiment of a device configured to implement the example query generation system illustrated in FIG. 1.

FIG. 4 is an embodiment of a device 400 configured to implement the query generation system 100. The device 400 comprises a processor 402, a memory 404, and a network interface 406. The device 400 may be configured as shown or in any other suitable configuration. The device 400 may be and/or may be used to implement the query generation device 112 and/or the database management system 130.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of method 200. In an embodiment, the function described herein is implemented using logic units, FPGAs, ASICs, DSPs, or any other suitable hardware or electronic circuitry.

The memory 404 is operable to store cleaning layer data 408, data quality layer data 410, database(s) 412, database management data 418, queries 416, natural language inputs 418, and/or any other data. The cleaning layer data 408, data quality layer data 410, database(s) 412, database management data 414, queries 416, and/or natural language inputs 418 may comprise any suitable set of instructions, logic, rules, or code operable to execute the function described herein. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The cleaning layer data 408 includes any suitable set of instructions, logic, rules, or code operable to execute the function of the cleaning layer 114 of FIG. 1. For example, the cleaning layer data 408 may include the keyword database 116 of FIG. 1. The data quality layer data 410 includes any suitable set of instructions, logic, rules, or code operable to execute the function of the plurality of data quality layers 118a,b of FIG. 1. The data quality layer data 410 may include the table definitions 120a,b, the table interactions 122a,b, the adjective definitions 124a,b, and any other information appropriate for generating queries (e.g., queries 126, 128 of FIG. 1) from natural language inputs (e.g., inputs 106a,b of FIG. 1). The data quality layer data 410 may include received project identifiers (e.g., including but not limited to project identifiers 108a,b of FIG. 1) and any appropriate instructions, logic, rules, or code for determining which data quality layer (e.g., of data quality layers 118a,b of FIG. 1) to associate with each project identifier (e.g., of identifiers 108a,b of FIG. 1).

The database(s) 414 include but are not limited to the one or more databases 132 of FIG. 1. Database(s) 414 include tables 134, 136, 138 of FIG. 1. The database management data 414 includes any suitable set of instructions, logic, rules, or code operable to implement the database management system 130 of FIG. 1. Queries 416 include but are not limited to queries 126 and 128. For instance, queries 416 may also include a record of previously generated queries (e.g., a historical log of queries generated by the query generation device 112 of FIG. 1). The natural language inputs 418 include but are not limited to natural language inputs 106a,b of FIG. 1. For instance, natural language inputs 418 may include a record of previously received natural language inputs. Each input of the record of previously received natural language inputs may be associated with a corresponding query from the record of previously generated queries.

The network interface 406 is configured to enable wired and/or wireless communications (e.g., via network 104). The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a query generation device configured to:
      receive, via a network, a first input provided in a first device of a first user and a first project identifier associated with the first user;
      receive, via the network, a second input provided in a second device of a second user and a second project identifier associated with the second user, wherein the first and second inputs are the same and are in a natural language format that is not compatible with a downstream database management system, the downstream database management system generating responses to queries based on information stored in a downstream database;

generate, based on the first input, a first database query associated with the first user using a first data quality layer associated with the first project identifier, the first data quality layer comprising first project-specific information for generating the first database query from the first input;

generate, based on the second input, a second database query associated with the second user using a second data quality layer associated with the second project identifier, the second data quality layer comprising second project-specific information for generating the second database query from the second input, wherein the first and second database queries are compatible with the downstream database management system and the first database query is different than the second database query;

transmit the first database query to a downstream database management system;

transmit the second database query to the downstream database management system; and the downstream database management system configured to:

receive the first database query and generate a corresponding first response to the first database query;

receive the second database query and generate a corresponding second response to the second database query;

wherein the query generation device is further configured to:

receive, from the downstream database management system, a first response to the first database query;

receive, from the downstream database management system, a second response to the second database query;

transmit, via the network, the first response to the first device;

transmit, via the network, the second response to the second device;

identify a portion of the first user input corresponding to an adjective, wherein the adjective describes a quantifiable characteristic associated with the user input;

determine, based on the first data quality layer, a value associated with the adjective;

generate, based on the first data quality layer, a conditional statement using the determined value; and append the conditional statement to the first database query.

2. The system of claim 1, wherein each of the first data quality layer and the second data quality layer comprises one or more table definitions associated with project-specific information stored in the downstream database, one or more table interactions associated with project-specific relationships between tables of the downstream database, and adjective definitions associated with project-specific values associated with adjectives presented in the natural language format.

3. The system of claim 1, wherein the query generation device is configured to generate the first database query by:

determining, for a portion of the first user input, a data type to request in the first query;

identifying, based on the first data quality layer, two project-specific tables of the downstream database to access in the first database query, wherein each of the two project-specific tables is associated with the determined data type;

generating a first query string corresponding to accessing information from a first of the two project specific tables;

generating a second query string corresponding to accessing information from a second of the two project specific tables; and joining the first and second query strings to generate the first database query.

4. The system of claim 1, wherein the query generation device is configured to generate the first database query by:

determining, for a portion of the first user input, a data type to request in the first query;

identifying, based on the first data quality layer, a column in a predetermined table of the downstream database corresponding to the data type;

generating a first query string, wherein the first query string corresponds to accessing information from the predetermined table;

generating a second query string, wherein the second data query corresponds to accessing information from the identified column of the predetermined table; and combining the first and second query strings to generate the first database query.

5. The system of claim 1, wherein the first response is different than the second response.

6. The system of claim 1, wherein the downstream database comprises one or more fact tables; and the first and second database queries are Structured Query Language (SQL) queries.

7. A method comprising:

receiving, via a network, a first input provided in a first device of a first user and a first project identifier associated with the first user;

receiving, via the network, a second input provided in a second device of a second user and a second project identifier associated with the second user, wherein the first and second inputs are the same and are in a natural language format that is not compatible with a downstream database management system, the downstream database management system generating responses to queries based on information stored in a downstream database;

generating, based on the first input, a first database query associated with the first user using a first data quality layer associated with the first project identifier, the first data quality layer comprising first project-specific information for generating the first database query from the first input;

generating, based on the second input, a second database query associated with the second user using a second data quality layer associated with the second project identifier, the second data quality layer comprising second project-specific information for generating the second database query from the second input, wherein the first and second database queries are compatible with the downstream database management system and the first database query is different than the second database query;

receiving, from the downstream database management system, a first response to the first database query;

receiving, from the downstream database management system, a second response to the second database query;

transmitting, via the network, the first response to the first device;

transmitting, via the network, the second response to the second device;

identifying a portion of the first user input corresponding to an adjective, wherein the adjective describes a quantifiable characteristic associated with the user input;

determining, based on the first data quality layer, a value associated with the adjective;

generating, based on the first data quality layer, a conditional statement using the determined value; and appending the conditional statement to the first database query.

8. The method of claim 7, wherein each of the first data quality layer and the second data quality layer comprises one or more table definitions associated with project-specific information stored in the downstream database, one or more table interactions associated with project-specific relationships between tables of the downstream database, and adjective definitions associated with project-specific values associated with adjectives presented in the natural language format.

9. The method of claim 7, wherein generating the first database query comprises:

determining, for a portion of the first user input, a data type to request in the first query;

identifying, based on the first data quality layer, two project-specific tables of the downstream database to access in the first database query, wherein each of the two project-specific tables is associated with the determined data type;

generating a first query string corresponding to accessing information from a first of the two project specific tables;

generating a second query string corresponding to accessing information from a second of the two project specific tables; and joining the first and second query strings to generate the first database query.

10. The method of claim 7, wherein generating the first database query comprises:

determining, for a portion of the first user input, a data type to request in the first query;

identifying, based on the first data quality layer, a column in a predetermined table of the downstream database corresponding to the data type;

generating a first query string, wherein the first query string corresponds to accessing information from the predetermined table;

generating a second query string, wherein the second data query corresponds to accessing information from the identified column of the predetermined table; and combining the first and second query strings to generate the first database query.

11. The method of claim 7, wherein the first response is different than the second response.

12. The method of claim 7, wherein the downstream database comprises one or more fact tables; and the first and second database queries are Structured Query Language (SQL) queries.

13. A system comprising:

a memory operable to store instructions; and a hardware processor communicatively coupled to the memory and a network interface, wherein the instructions, when executed by the hardware processor, cause the hardware processor to:

receive, via a network, a first input provided in a first device of a first user and a first project identifier associated with the first user;

receive, via the network, a second input provided in a second device of a second user and a second project identifier associated with the second user, wherein the first and second inputs are the same and are in a natural language format that is not compatible with a downstream database management system, the downstream database management system generating responses to queries based on information stored in a downstream database;

generate, based on the first input, a first database query associated with the first user using a first data quality layer associated with the first project identifier, the first data quality layer comprising first project-specific information for generating the first database query from the first input;

generate, based on the second input, a second database query associated with the second user using a second data quality layer associated with the second project identifier, the second data quality layer comprising second project-specific information for generating the second database query from the second input, wherein the first and second database queries are compatible with the downstream database management system and the first database query is different than the second database query;

receive, from the downstream database management system, a first response to the first database query;

receive, from the downstream database management system, a second response to the second database query;

transmit, via the network, the first response to the first device;

transmit, via the network, the second response to the second device;

identify a portion of the first user input corresponding to an adjective, wherein the adjective describes a quantifiable characteristic associated with the user input;

determine, based on the first data quality layer, a value associated with the adjective;

generate, based on the first data quality layer, a conditional statement using the determined value; and append the conditional statement to the first database query.

14. The system of claim 13, wherein each of the first data quality layer and the second data quality layer comprises one or more table definitions associated with project-specific information stored in the downstream database, one or more table interactions associated with project-specific relationships between tables of the downstream database, and adjective definitions associated with project-specific values associated with adjectives presented in the natural language format.

15. The system of claim 13, wherein the instructions, when executed, cause the hardware processor to generate the first database query by:

determining, for a portion of the first user input, a data type to request in the first query;

identifying, based on the first data quality layer, two project-specific tables of the downstream database to access in the first database query, wherein each of the two project-specific tables is associated with the determined data type;

generating a first query string corresponding to accessing information from a first of the two project specific tables;

generating a second query string corresponding to accessing information from a second of the two project specific tables; and joining the first and second query strings to generate the first database query.

16. The system of claim 13, wherein the instructions, when executed, cause the hardware processor to generate the first database query by:

determining, for a portion of the first user input, a data type to request in the first query;

identifying, based on the first data quality layer, a column in a predetermined table of the downstream database corresponding to the data type;

generating a first query string, wherein the first query string corresponds to accessing information from the predetermined table;

generating a second query string, wherein the second data query corresponds to accessing information from the identified column of the predetermined table; and combining the first and second query strings to generate the first database query.

17. The system of claim 13, wherein the first response is different than the second response.

* * * * *